United States Patent [19]

Marvin

[11] 4,188,111
[45] Feb. 12, 1980

[54] ADDITIVE TRI-COLOR LAMPHOUSE FOR A PHOTOGRAPHIC PRINTER

[75] Inventor: Roger L. Marvin, Wichita, Kans.
[73] Assignee: Kreonite, Inc., Wichita, Kans.
[21] Appl. No.: 942,878
[22] Filed: Sep. 15, 1978
[51] Int. Cl.² .................. G03B 27/54; G03B 27/76
[52] U.S. Cl. ..................................... 355/37; 355/1
[58] Field of Search ..................... 355/1, 32, 35, 37

[56] References Cited
U.S. PATENT DOCUMENTS

| | | | |
|---|---|---|---|
| 3,217,594 | 11/1965 | Simmon | 355/1 |
| 3,756,718 | 9/1973 | Letzer | 355/32 |
| 3,825,335 | 7/1974 | Reynolds | 355/37 X |
| 3,825,336 | 7/1974 | Reynolds | 355/37 X |
| 3,923,394 | 12/1975 | Frankiewicz | 355/37 |
| 3,950,093 | 4/1976 | Schneider | 355/37 |
| 4,129,372 | 12/1978 | Allgeier | 355/35 X |

Primary Examiner—Richard A. Wintercorn
Attorney, Agent, or Firm—Edwin H. Crabtree

[57] ABSTRACT

An additive tri-color lamp house having three lamps for conveying filtered light into a mixing chamber and illuminating a photographic image contained on a photographic film. The illuminated image is then projected onto a photosensitive paper for the purpose of making photographic prints and copies. The lamp house is characterized by having a combination of additive primary color filters and subtractive primary color filters positioned in front of the lamps and the amount of each additive primary color (i.e. red, green and blue) conveyed through the filters is controlled. By the proper positioning of the color filters in front of the lamps, the time required for proper exposure of the three separate emulsion layers on conventional color print paper is approximately equal.

6 Claims, 8 Drawing Figures

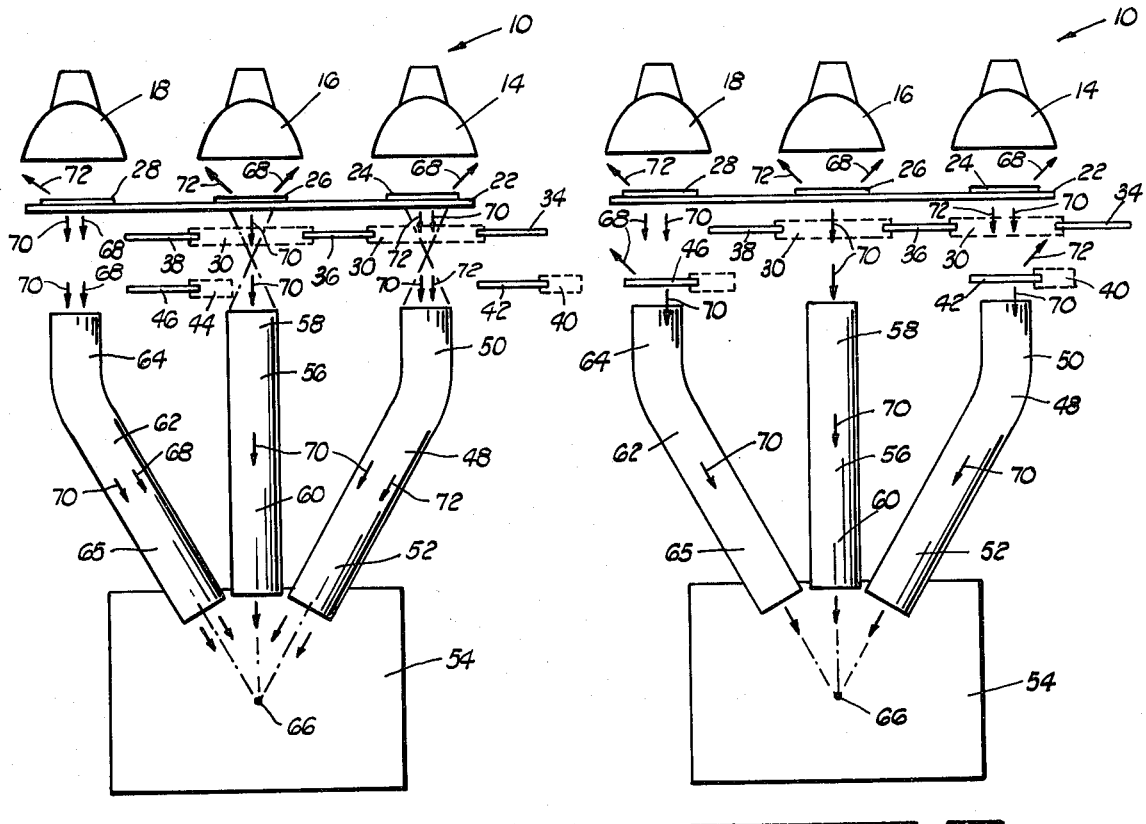
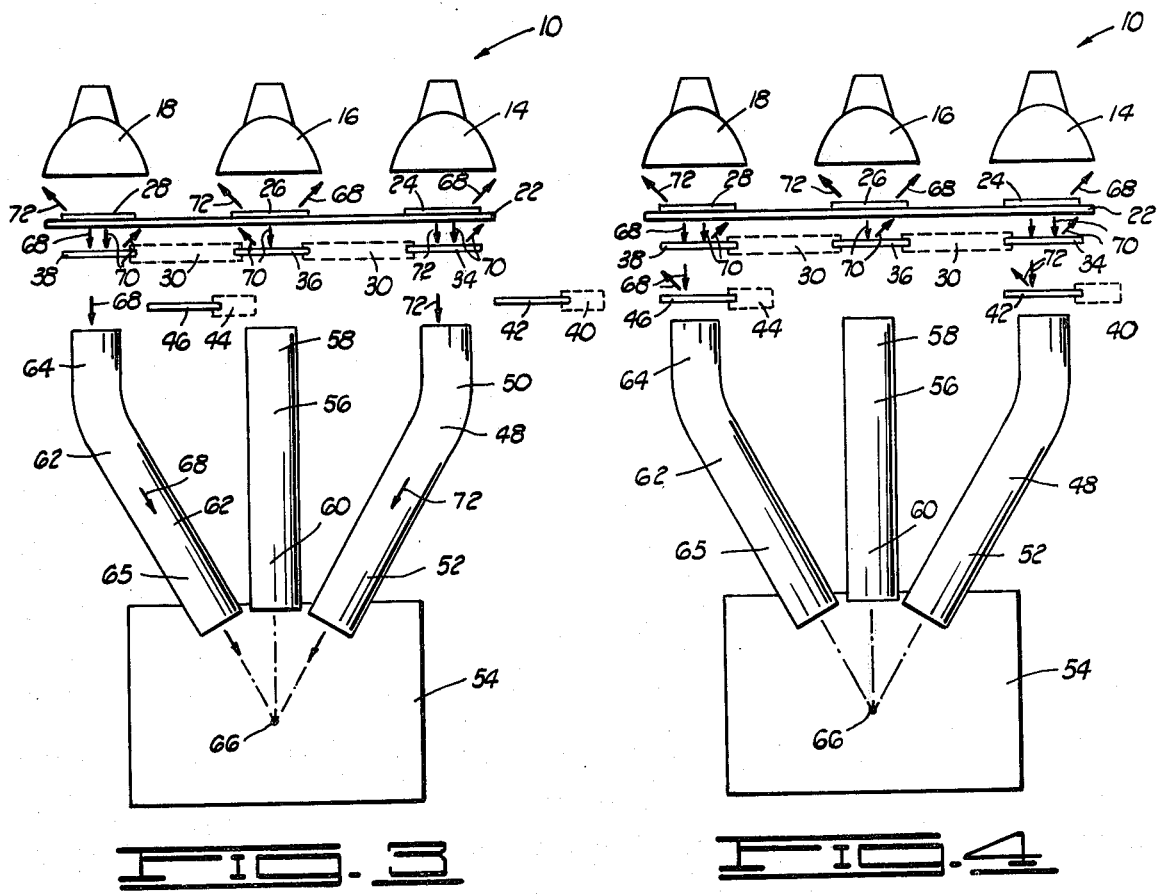

ADDITIVE TRI-COLOR LAMPHOUSE FOR A PHOTOGRAPHIC PRINTER

BACKGROUND OF THE INVENTION

This invention relates generally to a lamp house for a photographic printer and more particularly, but not by way of limitation, to an additive tri-color lamp house used for controlling the exposure time of the additive primary colors in the lamp house thereby controlling the time to expose the light sensitive color print paper.

Heretofore, a common type a standard lamp house for a color photographic printer used a single white printing light source wherein the additive primary color filters were successively swung into the path of the light source. The disadvantage of this type of color printing was the total exposure time is relatively long.

An inherent problem in the exposure of conventional color print paper is the red sensitive emulsion layer on the print paper being less sensitive than the blue and green emulsion layers. Therefore, when making a color print from a negative, a longer red exposure time is required than either the green or blue exposure time. In the past this problem has been recognized and described in U.S. Pat. No. 3,950,093 to Schneider wherein the apparatus included three light emitters having an adjustable light intensity for increasing the exposure time on the color print paper. The subject invention does not rely on adjusting the light intensity but solves the problem of the unequal exposure times required on the light sensitive emulsion layers on the print paper by using controlled time exposure using both additive primary color filters and subtractive primary color filters.

Other color printers and lamp houses are disclosed in U.S. Pat. No. 3,492,070 to Zahn, U.S. Pat. No. 3,756,718 to Letzer and U.S. Pat. No. 3,923,394 to Frankieviecz. Also there have been prior art color printers that use fiber optic rods for conveying and mixing filtered light. These patents are U.S. Pat. No. 3,217,594 to Simmon and U.S. Pat. Nos. 3,825,335 and 3,825,336 to Reynolds.

None of the above patents discloses the structure of the subject invention having a lamp house including a combination of additive primary color filters and subtractive primary color filters in combination with light transfer rods to accomplish the advantages described herein.

SUMMARY OF THE INVENTION

The subject invention controls the time of exposure of the three separate light sensitive emulsion layers of conventional color print paper so that the exposure time of the three additive primary colors is approximately equal.

Through the use of a combination of additive primary color filters and subtractive primary color filters positioned in front of three lamps the quantity of red light can be adjusted to be approximately three times the quantity of green or blue light. By controlling the quantities of red, green and blue light the exposure time on the color print paper is greatly reduced thereby increasing the overall speed in producing color prints and copies from the photographic printer.

The lamp house, through the use of light transfer rods for conveying the filtered light to a mixing chamber in the lamp house, greatly improves the quality of the color prints by a more thorough mixing of the filtered colors.

The lamp house eliminates the need of controlling light intensity and provides greater efficiency in the operation of the photographic printer through the use of controlled filtering of the three lamps using additive primary color filters and subtractive primary color filters.

By using a combination of color filters not only can the amount of red light be controlled to the mixing chamber, but also the amount of green and blue light can be controlled thereto should the red exposure requirement be satisfied prior to satisfying the green or blue light exposure requirement. Also the filters may be used in combination to block essentially all of the light from the three lamps when the red, green and blue exposure requirements are satisfied. The additive tri-color lamp house for a photographic printer includes a lamp house housing having a first lamp, a second lamp and a third lamp, mounted therein for passing light therethrough. A first filter holder having a first yellow filter, a red filter and a first magenta filter is positioned in front of the lamps. The first yellow filter is positioned in front of the first lamp. The red filter is positioned in front of the second lamp and the first magenta filter is positioned in front of the third lamp. A first moveable filter holder is pivotally mounted in the housing and includes a green filter, a shutter and a blue filter. When the first moveable filter holder is pivoted, the green filter is indexed in front of the first yellow filter. The shutter is indexed in front of the red filter and the blue filter is indexed in front of the first magenta filter. A second moveable filter holder is pivotally mounted in the housing and includes a second magenta filter. When the second moveable filter holder is pivoted the second magenta filter is indexed in front of the first yellow filter. A third moveable filter holder is pivotally mounted in the housing and includes a second yellow filter. When the third moveable filter holder is pivoted, the second yellow filter is indexed in front of the first magenta filter. Three light transfer rods are disposed in front of the filters with the filters positioned between the rods and the lamps. The rods receive the filtered light from the three lamps and transmit the light to a common spot in a mixing chamber in one end of the housing. The filtered light is then mixed in the mixing chamber prior to passing through a light diffuser plate and substantially illuminating a photographic image and exposing a photosensitive print paper.

The advantages and objects of the invention will become evident from the following detailed description of the drawings when read in connection with the accompanying drawings which illustrate preferred embodiments of the invention.

BRIEF DESCRIPTION OF THE DRAWINGS

FIGS. 1, 2, 3 and 4 are diagram drawings of the lamp house showing how the fixed color filter holder and first, second and third moveable filter holders are used in filtering the light from the three lamps.

FIG. 6 is an end view of the lamp house.

DETAILED DESCRIPTION OF THE DRAWINGS

Figure 5:
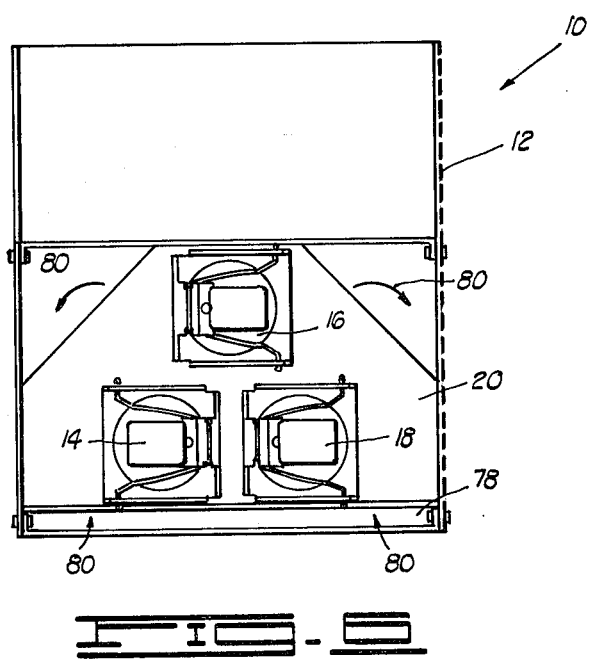
FIG. 5 is a side sectional view of the lamp house.

In FIGS. 1-4 diagrams are shown of the various color filter arrangements of the additive tri-color lamp house indicated by general reference numeral 10. Referring to FIG. 5, the lamp house 10 can be seen having a lamp house housing 12 for receiving and mounting the following described structure therein.

In the lamp house housing 12, a first lamp 14, a second lamp 16 and a third lamp 18 are mounted parallel to each other and secured to a lamp mounting plate 20 shown in FIGS. 5 and 6. The three lamps project white light outwardly therefrom. The lamps are electrically actuated and the electrical connections are not shown in the drawings.

A fixed filter holder 22 is attached to the housing 12 and includes a first yellow filter 24 positioned in front of the first lamp 14, a red filter 26 positioned in front of the second lamp 16 and a first magenta filter 28 positioned in front of the third lamp 18.

Figure 8:
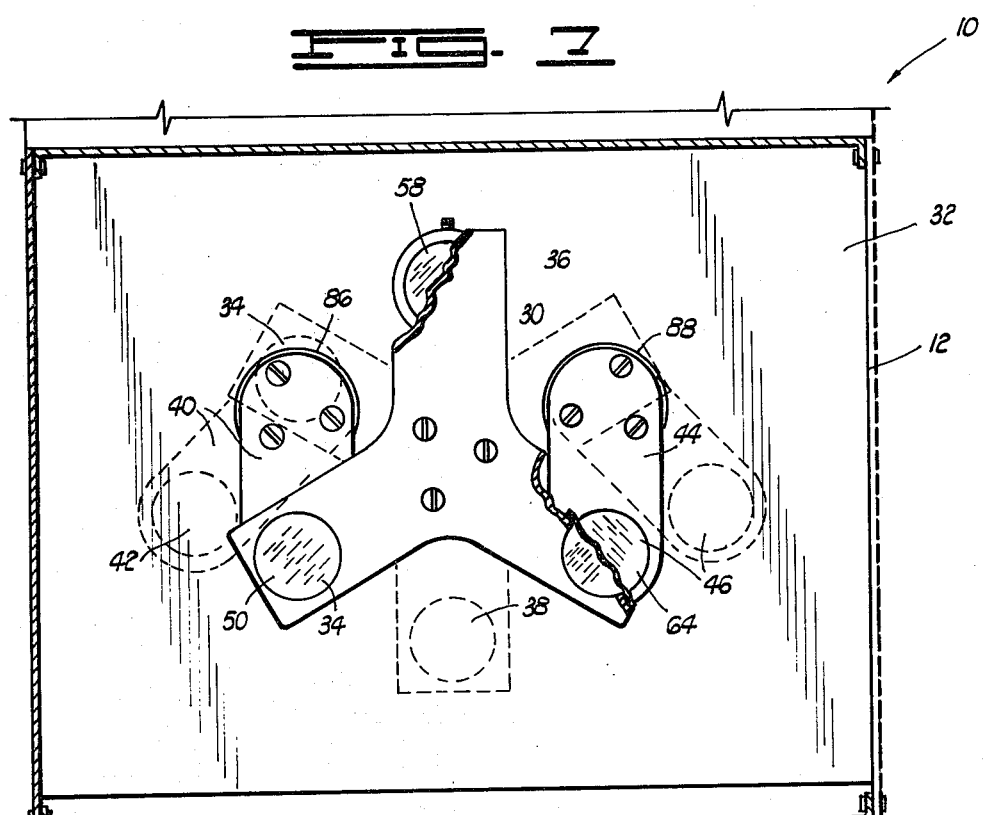
FIG. 8 is a front view of the first, second and third moveable filter holders taken along lines 8—8 shown in FIG. 5.

A first moveable filter holder 30 is pivotally mounted on a filter holder mounting plate 32 shown in FIGS. 5 and 8. The first moveable filter holder 30 includes a green filter 34, a shutter 36 and a blue filter 38. In FIG. 1 the first moveable filter holder 30 can be seen parallel to the fixed filter holder 22 with the filters 34, 36 and 38 positioned so that they do not interfere with the light passing through the filters 24, 26 and 28.

A second moveable filter holder 40 is also pivotally mounted on the mounting plate 32 and includes a second magenta filter 42. The second magenta filter 42 shown in FIG. 1 is also in a position not to interfere with the light passing through the filter 24.

A third moveable filter 44 is pivotally mounted on the mounting plate 32 and includes a second yellow filter 46. Again in FIG. 1 the yellow filter 46 is positioned so as to not interfere with the light passing through the filter 28.

A first light transfer rod 48 having a first end portion 50 is used for receiving the light from the first lamp 14. A second end portion 52 of the first rod 48 is received in a mixing chamber 54 and shown more clearly in cross section in FIG. 5. A second light transfer rod 56 having a first end portion 58 receives filtered light from the second lamp 16. A second end portion 60 of the second rod 56 is received in the mixing chamber 54 for projecting the filtered light therefrom. A third light transfer rod 62 includes a first end portion 64 for receiving filtered light from the third lamp 18. A second end portion 65 of the third rod 62 is received in the mixing chamber 54. The second end portions 52, 60 and 65 of the rods 48, 56 and 62 are positioned so that the filtered light is directed toward a common spot indicated by a dot 66 in the mixing chamber 54. By directing the filtered light to the common dot 66, increased diffusion of the filtered light is enhanced as the light is received inside the mixing chamber 54 prior to the light passing out of the housing 12 and onto a photographic image on a photographic film. The rods 48, 56 and 62 may be made of plastic, glass, acrylic fiber or any other similar material used in the photographic arts for light transfer.

In the use of interference color filters, it is important to point out, although those skilled in the art are aware of the following, that through the use of the first yellow filter 24, blue light is reflected as indicated by arrow 68, red light as indicated by arrow 70, and green light as indicated by arrow 72 all passing through the yellow filter 24. In the use of the red filter 26, the red light indicated by arrow 70 passes therethrough while the blue light 68 and the green light 72 is reflected. In the use of the magenta filter 28, the green light 72 is reflected and the red light 70 and blue light 68 are allowed to pass therethrough.

In FIG. 1 it can be seen that one of the major advantages of the subject invention through the use of the filters 24, 26 and 28, three units of red light as indicated by arrows 70, one unit of green light indicated by arrows 72, and one unit of blue light indicated by arrow 68, pass through the first, second and third rods 48, 56 and 62 and into the mixing chamber 54. By having three units or red light to one unit each of blue and green light the color emulsion layers of the color print paper are exposed at approximately the same time, thereby greatly increasing the efficiency of the photographic printer so that higher printing speeds may be obtained and unnecessary time delays in waiting for the exposure of the red sensitive emulsion layer of the print paper are eliminated.

In FIG. 2 the second moveable filter holder 40 and third moveable filter holder 44 have been actuated indexing the second magenta filter 42 in front of the first yellow filter 24 and the second yellow filter 46 is indexed in front of the first magenta filter 28.

By passing the second magenta filter 42 in front of the first yellow filter 24 the green light represented by arrow 72 is deflected allowing only the red filtered light represented by arrow 70 to pass therethrough. The second yellow filter 46 reflects the blue filtered light represented by arrow 68 thereby allowing only the red filtered light represented by arrow 70 to pass therethrough.

By providing this combination of filters shown in FIG. 2 only red light is passed to the three rods 48, 56 and 62 and into the mixing chamber 54. This combination of filters is important in that when both the blue exposure requirement and green exposure requirement are satisfied for the printing of the photographic print paper, then the red filtered light can be passed by itself into the mixing chamber 54 for satisfying the balance of the red exposure requirement. It should be pointed out that the second moveable filter holder 40 and third moveable filter holder 44 work independently of each other and, therefore, if the blue exposure requirement is satisfied first then the third moveable filter holder 44 may be actuated for reflecting all of the blue light. If the green exposure requirement is satisfied then the second moveable filter holder 40 may be actuated and all of the green filtered light will be reflected.

Figure 3:
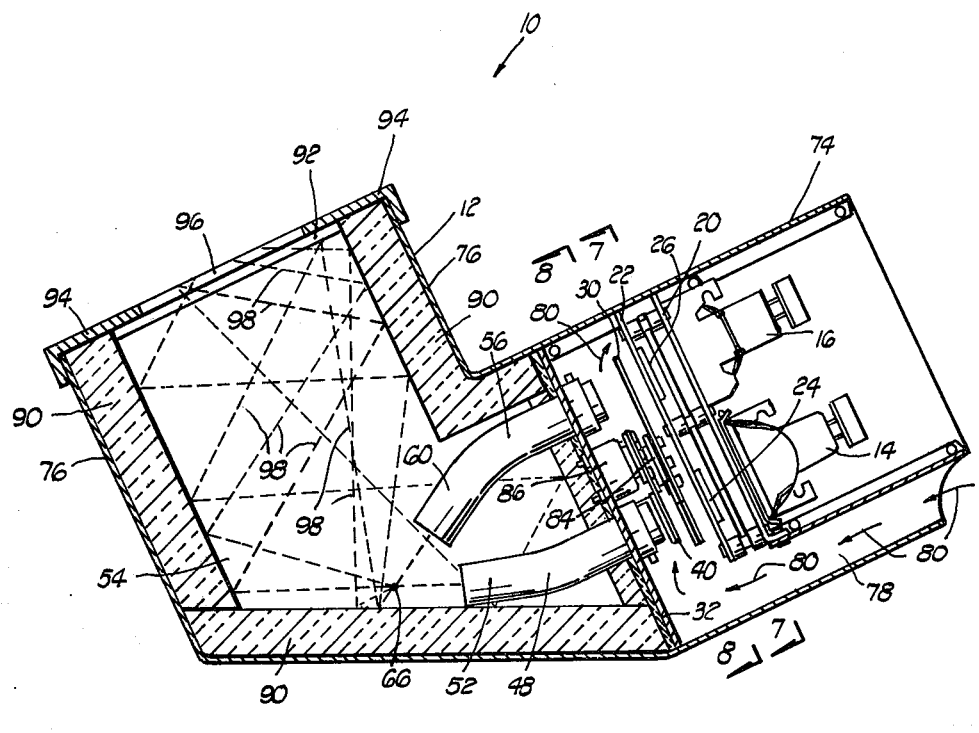

In FIG. 3 a diagram of the lamp house 10 is shown where if the red exposure requirement of the print paper is satisfied first, then only blue and green light may be passed therethrough. This is accomplished by actuating the first moveable filter holder 30 so that the green filter 34 is indexed in front of the first yellow filter 24, the shutter 36 is indexed in front of the red filter 26 and the blue filter 38 is indexed in front of the first magenta filter 28. All of the light is reflected from the second lamp 16. The combination of the yellow filter 24 and the green filter 34 reflecting the red and blue light represented by arrows 70 and 68 allows only the green light represented by arrow 72 to pass therethrough. The combination of the first magenta filter 28 and blue filter 38 reflect both the green and red light represented by arrows 72 and 70 allowing only the blue light represented by arrow 68 to pass through the third rod 62. As mentioned above, all of the red light has been reflected and the blue and green light is mixed in the mixing chamber 54 for satisfying the blue and green sensitive emulsion layer requirements of the color print paper.

In FIG. 4 a diagram of the lamp house 10 is shown where the filters are placed in combination when all of the exposure requirements of the primary additive colors red, green and blue are satisfied for the color print paper. This is accomplished by actuating the first moveable filter holder 30, the second moveable filter holder 40, and the third moveable filter holder 44. The second magenta filter 42 is now indexed with the green filter 34 and first yellow filter 24 thereby reflecting almost all of the primary additive colors. The second yellow filter 46 is indexed with the blue filter 38 and first magenta filter 28 again reflecting almost all of the primary additive colors. The shutter 36 indexed in front of the red filter 26 reflects the red light passing through red filter 26. In this view all of the colors making up the white light from the three lamps are reflected and almost no light is passed through the three rods. While the second magenta filter 42 and the second yellow filter 46 are shown, a pair of shutters could also be mounted on the second moveable filter holder 40 and third moveable holder 44 and accomplish the same purpose as described under FIG. 4.

In FIG. 5 the lamp house 10 can be seen more clearly although the third lamp 18 and third rod 62 are blocked from the reader's view. In this view the lamps and filters can be seen mounted in a first end portion 74 of the housing 12. Mounted in a second end portion 76 of the housing 12 is the mixing chamber 54.

The first end portion 74 of the housing 12 includes an air channel 78 for receiving circulated air indicated by arrows 80 which is blown therethrough and past the lamps and filters for cooling the lamp house 10 from the heat generated by the lamps.

The first moveable filter holder 30 can be seen attached to an electrically operated solenoid 84 mounted on the mounting plate 32. Also shown in this figure is an electrically operated solenoid 86 attached to the mounting plate 32 and the second moveable filter holder 40 for pivoting the holder 40. Mounted behind the solenoid 86 is another electrically operated solenoid 88 which can be seen in FIG. 8 for pivoting the third filter holder 44.

The mixing chamber 54 is lined with a reflective material 90 which is used for reflecting the filtered light in the interior of the chamber 54. Also a light diffusion plate 92 is received adjacent a mixing chamber cap 94 having an aperture 96 therethrough. The filtered light represented by dotted lines 98 is received through the rods and to a common dot 66. The light is then diffused throughout the mixing chamber 54 shown by the random lines 98 prior to exiting through the diffusion plate 92 and out the aperture 96 where the diffused filtered light illuminates the photographic image on the photographic film. The illuminated image is then projected onto the photosensitive print paper for making the prints or copies.

In FIG. 6 an end view of the lamp house 10 is seen showing the lamps 14, 16 and 18 mounted on the plate 20. Also seen in this view is the channel 78 for circulating the air into the housing 12. The upper corners of the plate 20 are angled so that the return air can be circulated out the housing 12.

Figure 7:
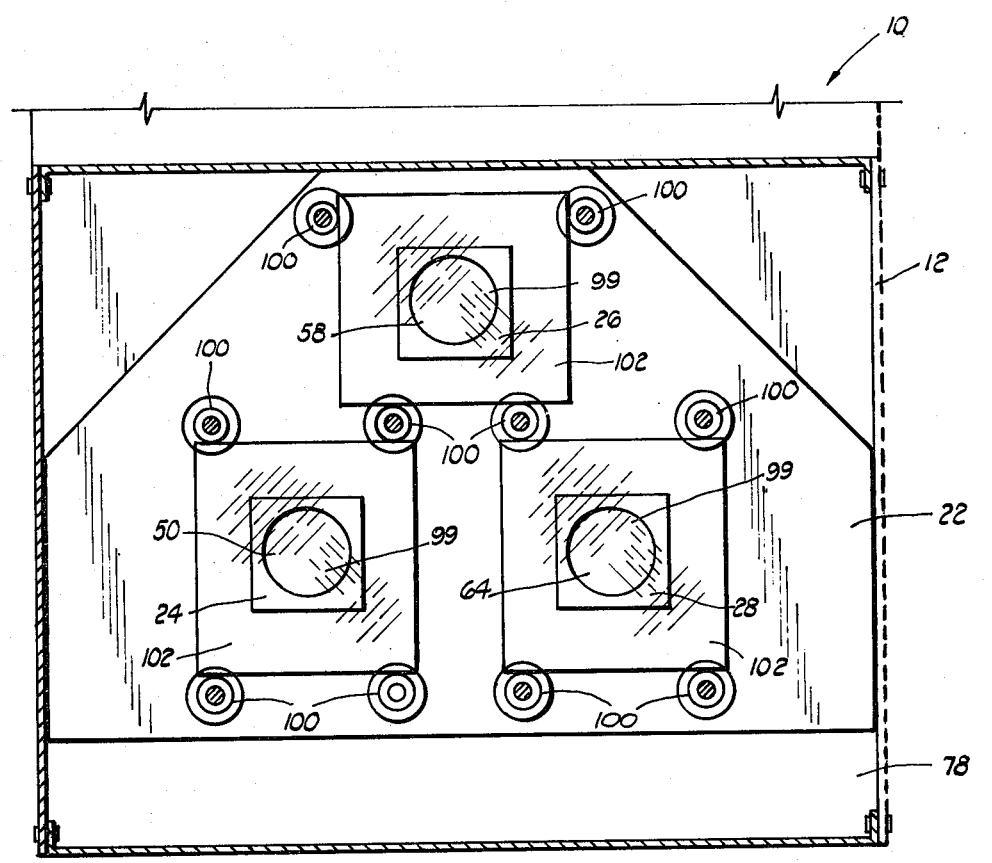
FIG. 7 is a front view of the fixed filter holder taken along lines 7—7 shown in FIG. 5.

In FIG. 7 a cross section of the housing 12 taken along lines 7—7 shown in FIG. 5 is illustrated. In this view the yellow filter 24, the red filter 26 and the blue filter 28 can be seen mounted on the fixed holder 22. The holder 22 has three apertures 99 and is indexed in front of the filters so the filtered light can pass therethrough. Looking through the filters, the annular cross section of the first end portions 50, 58 and 64 of the rods 48, 56 and 62 can be seen. Mounted in front of the filters 24, 26 and 28 are three infrared reflecting interference type filters 102 attached to the holder 22 by connecting rods 100. The filters 102 reflect the heat from the lamps so that heat rays do not pass through the color filters and rods.

In FIG. 8 a cross section of the housing 12 taken along lines 8—8 shown in FIG. 5 is illustrated. In this view a front view of the first moveable filter holder 30 can be seen. The holder 30 can be seen with the green filter 34, shutter 36 and blue filter 38 indexed in front of the first end portions 50, 58 and 64 of the rods 48, 56 and 62. When the electrical solenoid 84 attached to the holder 32 is actuated the holder 32 is pivoted 45 degrees into a position shown in dotted lines so that the filters 34 and 38 and the shutter 36 are not blocking the light passing from the lamps to the rods. Also shown in FIG. 8 is the second moveable filter holder 40 with the second magenta filter 42 positioned in front of the first end portion 50 of the rod 48. When the solenoid 86 is actuated, the second magenta filter 42 is moved 45 degrees shown in dotted lines, so that it is no longer in the path of the light passing from the first lamp 14. The third moveable holder 44 is shown with the second yellow filter 46 in position in front of the first end portion 64 of the third rod 62. By actuating the electrical solenoid 88 the holder 44 is rotated 45 degrees shown in dotted lines, and the second yellow filter 46 is no longer in the path of the light passing from the third lamp 18 to the third rod 62.

Changes may be made in the construction and arrangement of the parts or elements of the embodiments as described herein without departing from the spirit or scope of the invention defined in the following claims.

What is claimed is:

1. An additive tri-color lamp house for a photograph printer, the lamp house comprising:
   a lamp house housing;
   a first lamp, a second lamp, and a third lamp, said lamps mounted in said housing for passing light therethrough;
   a fixed filter holder mounted in said housing, said holder disposed in front of said lamps, said holder including a first yellow filter positioned in front of said first lamp, a red filter positioned in front of said second lamp, and a first magenta filter positioned in front of said third lamp;
   light guide means mounted in said housing and disposed in front of said yellow, red and magenta filters for receiving the filtered light therefrom; and
   a mixing chamber disposed in said housing and communicating with said light guide means for receiving the filtered light therefrom and mixing the filtered light therein.

2. The lamp house as described in claim 1 further including a first moveable filter holder pivotally mounted in said housing and disposed between said light guide means and said fixed filter holder, said first moveable filter holder including a green filter, a shutter, and a blue filter, when said first moveable filter holder is pivoted said green filter is indexed in front of said yellow filter, said shutter is indexed in front of said red filter, and said blue filter is indexed in front of said first magenta filter.

3. The lamp house as described in claim 1 further including a second moveable filter holder pivotally mounted in said housing and disposed between said light guide means and said fixed filter holder, said second moveable filter holder including a second magenta filter, when said second moveable filter holder is pivoted, said second magenta filter is indexed in front of said first yellow filter.

4. The lamp house as described in claim 1 further including a third moveable filter holder pivotally mounted in said housing and disposed between said light guide means and said fixed filter holder, said third moveable filter holder including a second yellow filter, when said third moveable filter holder is pivoted said second yellow filter is indexed in front of said first magenta filter.

5. The lamp house as described in claim 1 wherein said light guide means is a first light transfer rod, a second light transfer rod, and a third light transfer rod, one end of said first rod is positioned in front of said first yellow filter, one end of said second rod is positioned in front of said red filter, one end of said third rod is positioned in front of said first magenta filter, the opposite ends of said rods received in said mixing chamber for transmitting the filtered light received through said filters into said mixing chamber.

6. The additive tri-color lamp house for a photographic printer, the lamp house comprising:
 a lamp house housing;
 a first lamp, a second lamp, and a third lamp, said lamps mounted in said housing for passing light therethrough;
 a fixed filter holder mounted in said housing, said holder disposed in front of said lamps, said holder including a first yellow filter positioned in front of said first lamp, a red filter positioned in front of said second lamp, and a first magenta filter positioned in front of said third lamp;
 light guide means mounted in said housing and disposed in front of said yellow, red and magenta filters for receiving the filtered light therefrom;
 a mixing chamber disposed in said housing and communicating with said light guide means for receiving the filtered light therefrom and mixing the filtered light therein;
 a first moveable filter holder pivotally mounted in said housing and disposed between said light guide means and said fixed filter holder, said first moveable filter holder including a green filter, a shutter, and a blue filter, when said first moveable filter holder is pivoted said green filter is indexed in front of said first yellow filter, said shutter is indexed in front of said red filter, and said blue filter is indexed in front of said first magenta filter;
 a second moveable filter holder pivotally mounted in said housing and disposed between said light guide means and said fixed filter holder, said second moveable filter holder including a second magenta filter, when said second moveable filter holder is pivoted, said second magenta filter is indexed in front of said first yellow filter; and
 a third moveable filter holder pivotally mounted in said housing and disposed between said light guide means and said fixed filter holder, said third moveable filter holder including a second yellow filter, when said third moveable filter holder is pivoted said second yellow filter is indexed in front of said first magenta filter.

* * * * *